US012743135B2

(12) United States Patent
Jung et al.

(10) Patent No.: US 12,743,135 B2
(45) Date of Patent: Sep. 22, 2026

(54) DISPLAY DEVICE AND WINDOW MODULE

(71) Applicant: Samsung Display Co., Ltd., Yongin-si (KR)

(72) Inventors: Taehyeog Jung, Yongin-si (KR); Byunghoon Kang, Yongin-si (KR); Sanghoon Kim, Yongin-si (KR); Jingyu Sim, Yongin-si (KR); Seongjin Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 205 days.

(21) Appl. No.: 18/656,797

(22) Filed: May 7, 2024

(65) Prior Publication Data

US 2024/0419218 A1 Dec. 19, 2024

(30) Foreign Application Priority Data

Jun. 19, 2023 (KR) ........................ 10-2023-0078171

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,431,635 | B2 | 10/2019 | Breedlove et al. | |
| 10,632,711 | B2 * | 4/2020 | Lee | B32B 25/20 |
| 11,099,607 | B2 | 8/2021 | Kim et al. | |
| 11,948,481 | B2 * | 4/2024 | Lee | G09F 9/301 |
| 12,418,995 | B2 * | 9/2025 | Lee | H05K 5/0217 |
| 12,488,710 | B2 * | 12/2025 | Lee | G09F 9/301 |
| 12,507,352 | B2 * | 12/2025 | Ha | B32B 17/10 |
| 2022/0058991 | A1 * | 2/2022 | Lee | G09F 9/301 |
| 2022/0203479 | A1 * | 6/2022 | Kwon | B23K 26/364 |
| 2023/0384835 | A1 * | 11/2023 | Kang | H04M 1/0268 |
| 2024/0249649 | A1 * | 7/2024 | Lee | G09F 9/301 |
| 2024/0353593 | A1 * | 10/2024 | Park | G06F 1/1652 |

(Continued)

FOREIGN PATENT DOCUMENTS

| | | |
|---|---|---|
| KR | 10-2018-0055973 | 5/2018 |
| KR | 10-2018-0079093 | 7/2018 |

(Continued)

*Primary Examiner* — Lisa Lea-Edmonds
(74) *Attorney, Agent, or Firm* — Sughrue Mion, PLLC

(57) ABSTRACT

A display device includes a display module folded with respect to a folding axis extending in a direction and a window disposed on the display module and including a folding portion and a non-folding portion, the folding portion being folded with respect to the folding axis. The folding portion includes a first folding surface adjacent to the display module and a second folding surface opposite to the first folding surface and spaced apart from the first folding surface. Multiple first grooves may be defined in the first folding surface, multiple second grooves may be defined in the second folding surface, and a ratio of a Young's modulus of the folding portion to a Young's modulus of the non-folding portion may be in a range of about 30/70000 to about 2000/70000.

21 Claims, 5 Drawing Sheets

(56) References Cited

U.S. PATENT DOCUMENTS

2024/0419218 A1* 12/2024 Jung .................... G06F 1/1656
2025/0117047 A1* 4/2025 Kuk ..................... G06F 1/1618

FOREIGN PATENT DOCUMENTS

| | | |
|---|---|---|
| KR | 10-2378856 | 3/2022 |
| KR | 10-2022-0092664 | 7/2022 |
| KR | 10-2442607 | 9/2022 |

* cited by examiner

DISPLAY DEVICE AND WINDOW MODULE

CROSS-REFERENCE TO RELATED APPLICATIONS

This patent application claims priority under 35 U.S.C. § 119 from Korean Patent Application No. 10-2023-0078171 filed on Jun. 19, 2023 in the Korean Intellectual Property Office, the contents of which are incorporated herein by reference.

BACKGROUND

1. Technical Field

The disclosure relates to a window module including a window in which grooves may be defined and a display device including the window module.

2. Description of the Related Art

A display device displays various images through a display screen to provide a user with information. In general, the display device displays information in an allocated area of the display screen. In recent years, flexible display devices including a flexible display panel that may be folded are being developed. Different from a rigid display device, the flexible display device may be foldable, rollable, or bendable. The flexible display device, which may be capable of being transformed into various shapes, may be readily carried and may improve a user's convenience regardless of the original size of the display screen.

In a case where a structure to secure a flexibility of the flexible display device may be applied to the flexible display device, a durability of the flexible display device against impact may weaken. In a case where a structure to strengthen the durability of the flexible display device against impact may be applied to the flexible display device, the flexibility of the flexible display device may deteriorate.

SUMMARY

The disclosure provides a foldable window module with improved durability.

The disclosure provides a display device including the foldable window module with improved durability.

Embodiments of the inventive concept provide a display device that may include a display module folded with respect to a folding axis that extends in a first direction and a window disposed on the display module and including a folding portion and a non-folding portion. The folding portion may include a first folding surface adjacent to the display module, the first folding surface may include a plurality of first grooves defined therein, and a second folding surface opposite to the first folding surface and spaced apart from the first folding surface by a thickness of the window, the second folding surface may include a plurality of second grooves defined therein. The folding portion may fold with respect to the folding axis, and a ratio of a Young's modulus of the folding portion to a Young's modulus of the non-folding portion may be in a range of about 30/70000 to about 2000/70000.

The thickness of the window may be in a range of about 100 micrometers to about 175 micrometers, and a radius of curvature with respect to the folding axis may be in a range of about 1.0 mm to about 2.0 mm.

The thickness of the window may be about 100 micrometers.

The thickness of the window may be about 125 micrometers, the radius of curvature may be in a range of about 1.0 mm to about 1.5 mm, and the ratio of the Young's modulus of the folding portion to the Young's modulus of the non-folding portion may be in a range of about 50/70000 and to about 2000/70000.

The ratio of the Young's modulus of the folding portion to the Young's modulus of the non-folding portion may be in a range of about 75/70000 to about 2000/70000. Either the thickness of the window may be about 150 μm and the radius of curvature may be about 1.0 mm, or the thickness of the window may be about 125 μm and the radius of curvature may be about 2.0 mm.

The ratio of the Young's modulus of the folding portion to the Young's modulus of the non-folding portion may be in a range of about 100/70000 to about 2000/70000. Either the thickness of the window may be about 175 μm and the radius of curvature may be about 1.0 mm, or the thickness of the window may be in a range of about 150 μm to about 175 μm and the radius of curvature may be in a range of about 1.5 mm to about 2.0 mm.

The Young's modulus of the non-folding portion may be in a range of about 65 GPa to about 75 GPa.

The plurality of first grooves and the plurality of second grooves may be disposed in an alternating manner in a second direction intersecting the first direction in a plan view.

The window includes a plurality of first folding intermediate portions and a plurality of second folding intermediate portions, the plurality of first folding intermediate portions may overlap the plurality of first grooves respectively in a plan view, the plurality of second folding intermediate portions may overlap the plurality of second grooves respectively in a plan view, and a thickness of each of the plurality of first folding intermediate portions and the plurality of second folding intermediate portions may be in a range of about 35 μm to about 40 μm.

The thickness of each of the plurality of first folding intermediate portions and the thickness of each of the plurality of second folding intermediate portions may be about equal to each other.

A width in a second direction intersecting the first direction of each of the plurality of first grooves and each of the plurality of second grooves may be in a range of about 80 μm to about 100 μm.

A width of a sidewall portion of the folding portion disposed between one of the plurality of first grooves and an adjoining one of the plurality of the second grooves may be in a range of about 25 μm to about 35 μm.

Each of a distance between two of the plurality of first grooves that are adjacent to each other and a distance between two of the plurality of second grooves that are adjacent to each other may be in a range of about 120 μm to about 150 μm.

The display device may further include a protective film disposed on the window.

The window may include a glass material.

The plurality of first grooves and the plurality of second grooves may not overlap the non-folding portion in a plan view.

Embodiments of the inventive concept provide a window module that may include a window including a folding portion and a non-folding portion and a protective film disposed on the window. The folding portion may include a first folding surface including a plurality of first grooves defined therein and a second folding surface including a plurality of second grooves defined therein, the second folding surface may be opposite to the first folding surface and spaced apart from the first folding surface by a thickness of the window. The folding portion may fold with respect to a folding axis that extends in a first direction. A ratio of a Young's modulus of the folding portion to a Young's modulus of the non-folding portion may be in a range of about 30/70000 to about 2000/70000, and a shortest distance between the folding axis and an upper surface of the protective film may be in a range of about 1.0 mm to about 2.0 mm.

The window module may further include an adhesive layer disposed between the window and the protective film.

The plurality of first grooves and the plurality of second grooves may be disposed in an alternating manner in a second direction intersecting the first direction in a plan view.

The plurality of first grooves and the plurality of second grooves may not overlap the non-folding portion in a plan view.

According to the above, as the grooves may be defined in both of an upper surface and a lower surface of the window, the window module may be folded, and durability of the window module may be improved.

According to the above, the display device that includes the window module that includes the window provided with the grooves defined in both of the upper and lower surfaces of the window may be folded and may have improved durability.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
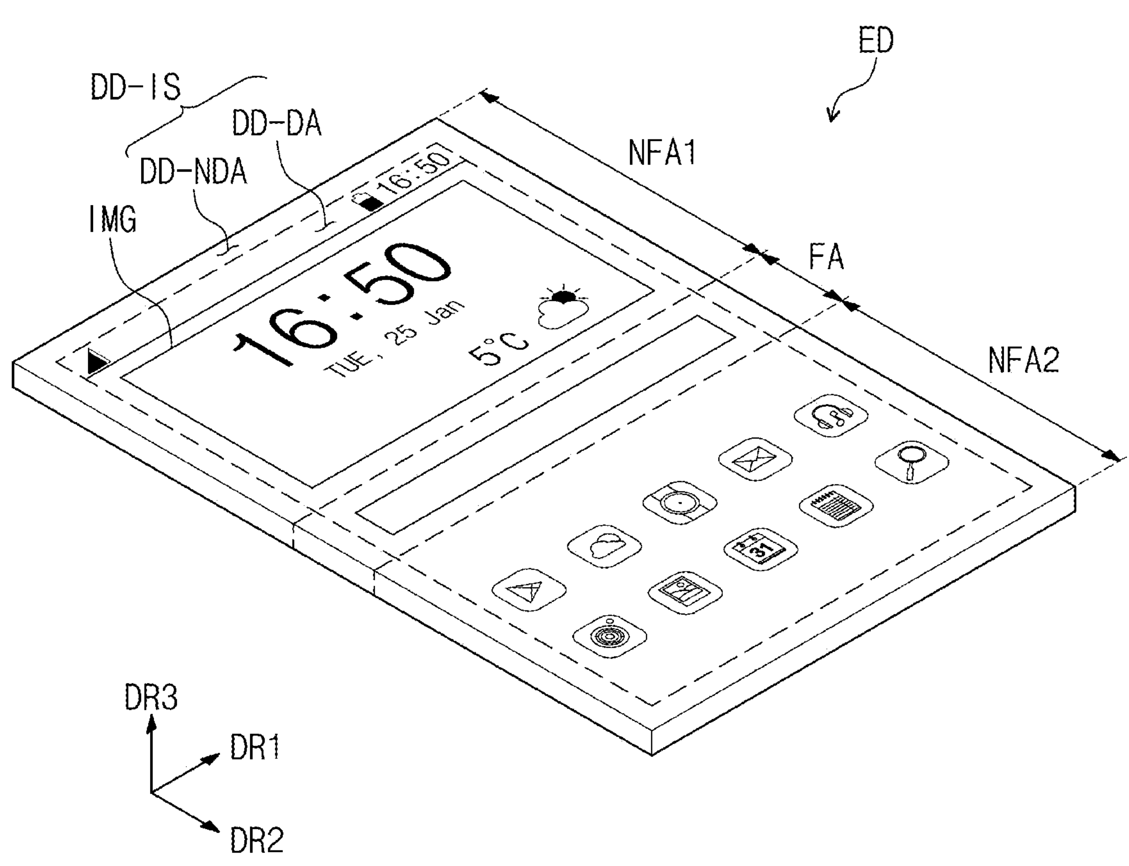
FIG. 1 is a perspective view of a display device according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis (or DR1, DR2, and DR3) are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Hereinafter, embodiments of the disclosure will be described with reference to accompanying drawings.

FIG. 1 is a perspective view of a display device ED according to an embodiment of the disclosure.

Referring to FIG. 1, the display device ED may display an image IMG through a display surface DD-IS. In FIG. 1, a clock widget image, a search box image, and application icon images are shown as the image IMG. The display surface DD-IS may be substantially parallel to a plane defined by a first direction DR1 and a second direction DR2. A normal line direction of the display surface DD-IS, i.e., a thickness direction of the display device ED, may be indicated by a third direction DR3. Front (or upper) and rear (or lower) surfaces of each member or each unit of the display device ED may be distinguished from each other with respect to the third direction DR3.

The display surface DD-IS may include a display area DD-DA through which the image IMG may be displayed and a non-display area DD-NDA defined adjacent to the display area DD-DA. The image IMG may not be displayed through the non-display area DD-NDA. The display area DD-DA may have a quadrilateral shape. The non-display area DD-NDA may surround the display area DD-DA, however, the disclosure may not be limited thereto or thereby. The shape of the display area DD-DA and the shape of the non-display area DD-NDA may be designed relative to each other. According to an embodiment, the non-display area DD-NDA may be omitted.

FIG. 1 shows a portable electronic device as a representative example of the display device ED, however, the disclosure should not be limited thereto or thereby. The display device ED may be applied to a large-sized electronic item, such as a television set and a monitor, and a small- and medium-sized electronic item, such as a mobile phone, a tablet computer, a car navigation unit, a game unit, and a smart watch.

Figure 2A:
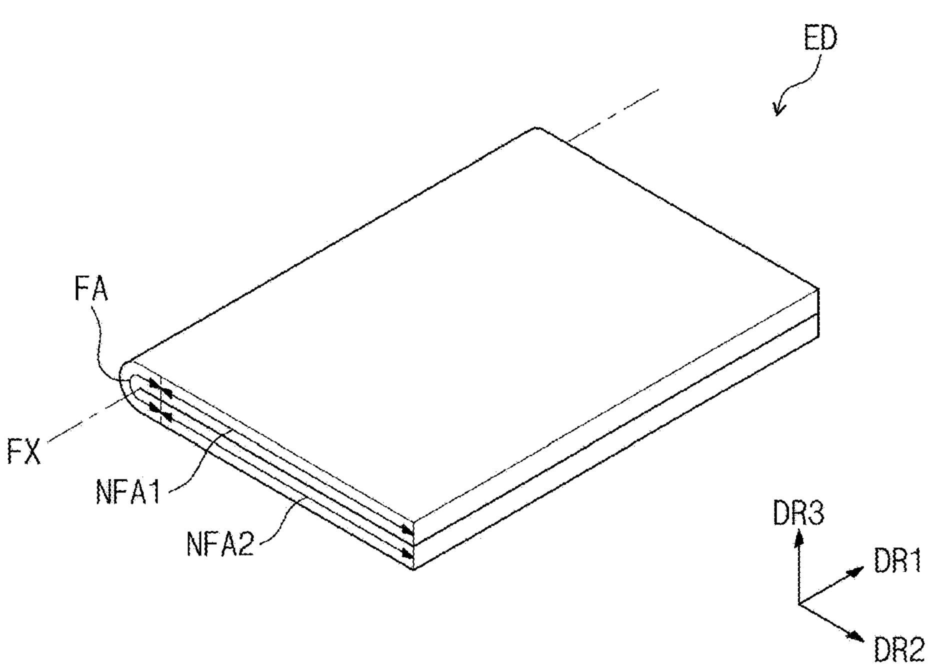
FIG. 2A is a perspective view of a display device that is inwardly folded (in-folding) according to an embodiment of the disclosure.
Figure 2B:
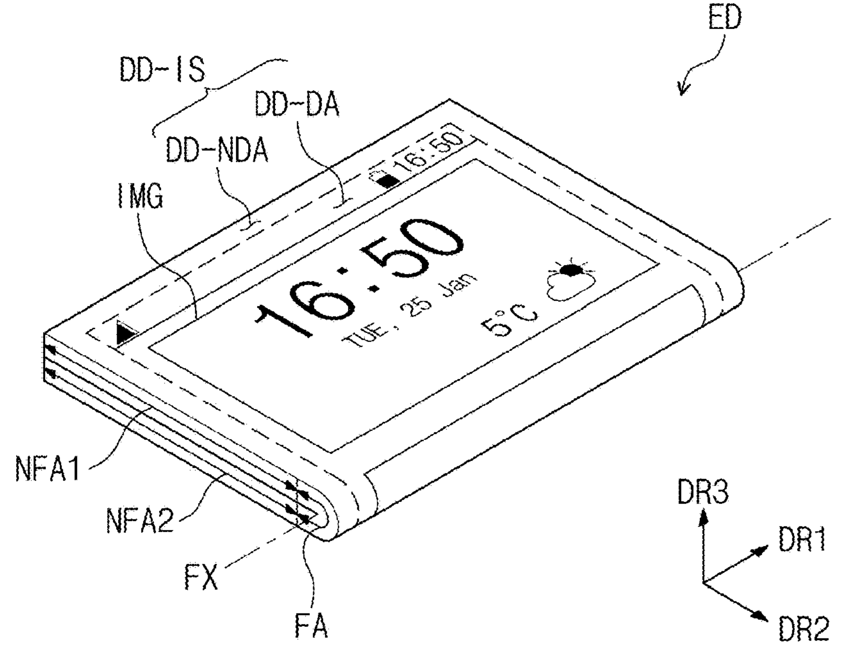
FIG. 2B is a perspective view of a display device that is outwardly folded (out-folding) according to an embodiment of the disclosure.

FIG. 2A is a perspective view of the display device ED that may be inwardly folded (in-folding) according to an embodiment of the disclosure. FIG. 2B is a perspective view of the display device ED that may be outwardly folded (out-folding) according to an embodiment of the disclosure.

Referring to FIG. 2A, the display device ED may include multiple areas defined according to its operation state. The display device ED may include a first non-folding area NFA1, a second non-folding area NFA2, and a folding area FA disposed between the first non-folding area NFA1 and the second non-folding area NFA2. The first non-folding area NFA1, the folding area FA, and the second non-folding area NFA2 may be sequentially arranged in the second direction DR2. The folding area FA may be folded on the basis of a folding axis FX, and the folding area FA may be an area that substantially forms a curvature.

The display device ED may be inwardly folded (inner-folding) to allow the display surface DD-IS corresponding to the first non-folding area NFA1 to face the display surface DD-IS corresponding to the second non-folding area NFA2.

Referring to FIG. 2B, the display device ED may be outwardly folded (outer-folding) to allow the display surface DD-IS to be exposed to the outside. The folding axis FX may extend in the first direction DR1, and the folding axis FX may be a minor axis of the display device ED.

Figure 3:
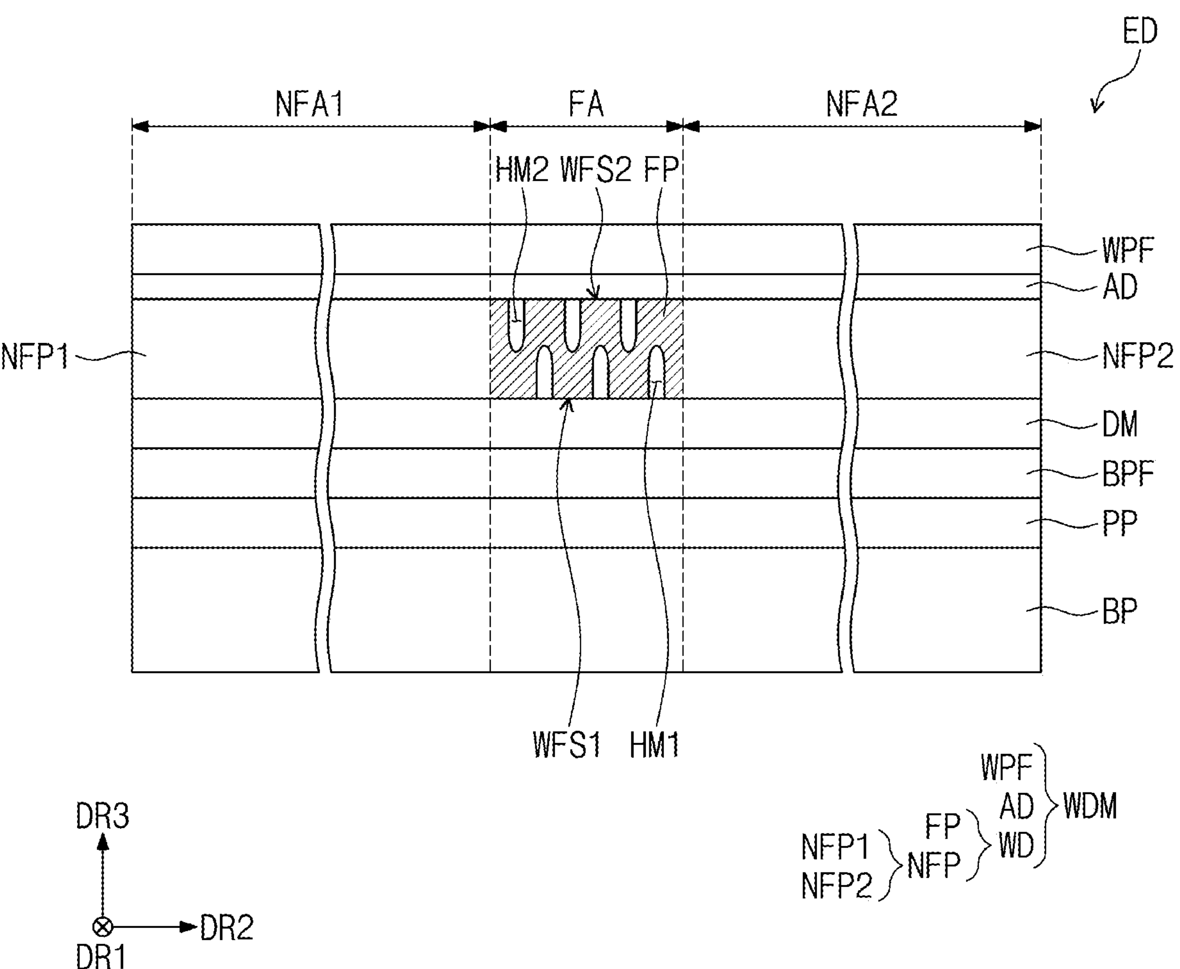
FIG. 3 is a schematic cross-sectional view of a display device according to an embodiment of the disclosure.
Figure 4:
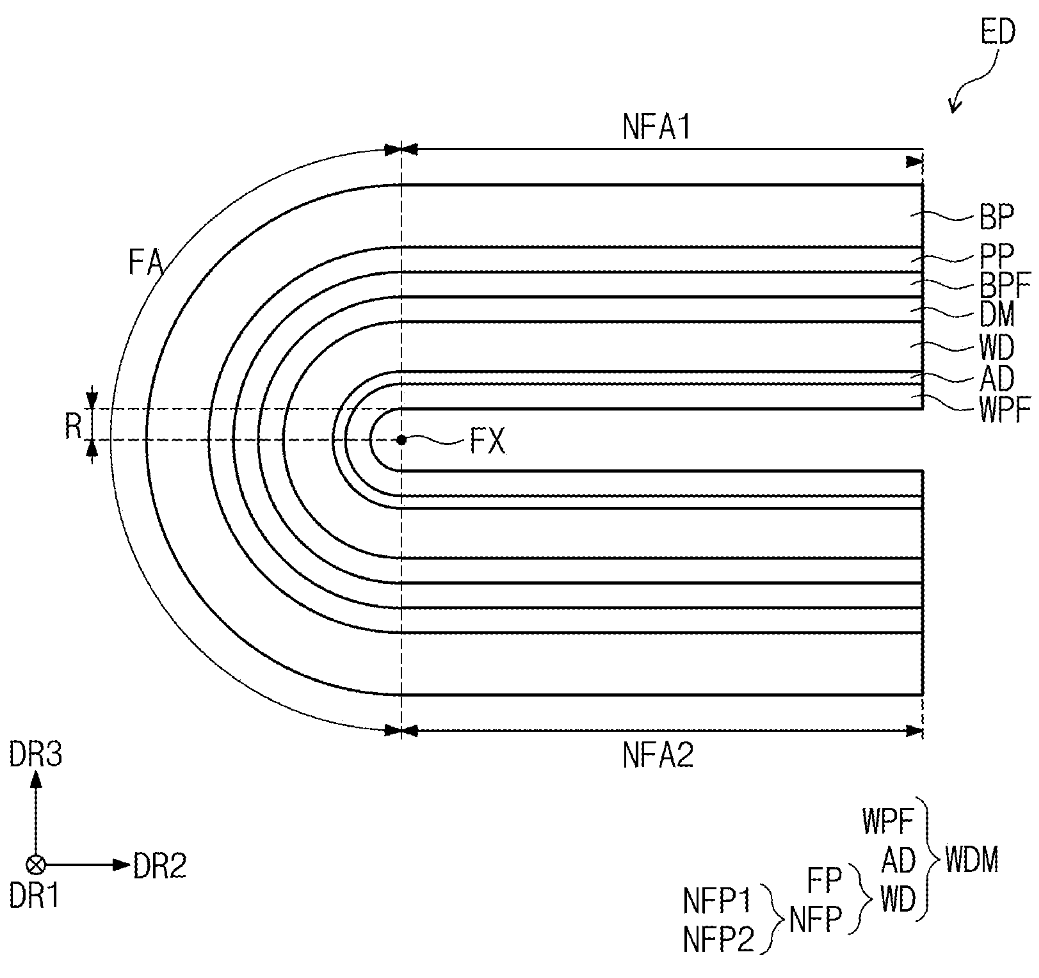
FIG. 4 is a schematic cross-sectional view of a display device in a folded state according to an embodiment of the disclosure.
Figure 5:
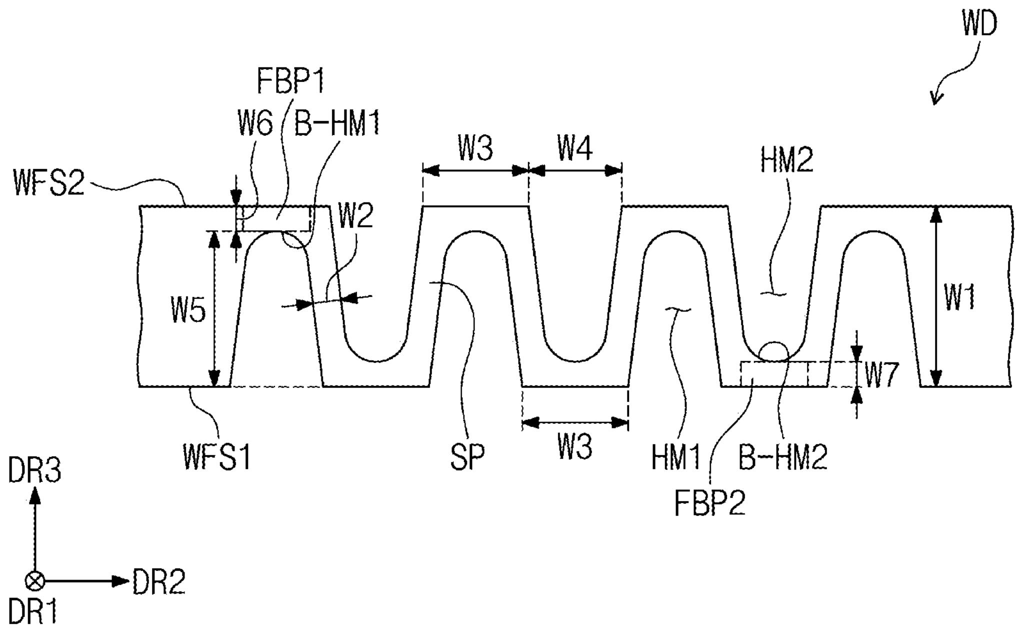
FIG. 5 is an enlarged schematic cross-sectional view of a window shown in FIG. 3.

FIG. 3 is a schematic cross-sectional view of the display device ED according to an embodiment of the disclosure. FIG. 4 is a schematic cross-sectional view of the display device ED in a folded state according to an embodiment of the disclosure. FIG. 5 is an enlarged schematic cross-sectional view of a window WD shown in FIG. 3.

Referring to FIG. 3, the display device ED may include a window module WDM, a display module DM, a lower protective film BPF, a protective panel PP, and a lower member BP. The window module WDM may include a protective film WPF, an adhesive layer AD, and the window WD. The display device ED may be a flexible display device ED, and thus, each of the window module WDM, the display module DM, the lower protective film BPF, the protective panel PP, and the lower member BP may have a flexibility.

The display module DM may include the first non-folding area NFA1, the second non-folding area NFA2, and the folding area FA. The display module DM may include a display panel, a sensing portion, and an anti-reflective layer. According to an embodiment, at least one of the sensing portion and the anti-reflective layer may be omitted. As an example, the display module DM may include only the display panel. The display panel may be a light emitting type display panel, however, it should not be particularly limited. For instance, the display panel may be an organic light emitting display panel or a quantum dot light emitting display panel. A light emitting layer of the organic light emitting display panel may include an organic light emitting material. A light emitting layer of the quantum dot light emitting display panel may include a quantum dot and/or a quantum rod.

The lower protective film BPF may be disposed under the display module DM. The lower protective film BPF may prevent scratches from occurring on a rear surface of the display module DM during a manufacturing process of the display module DM. The lower protective film BPF may be a colored polyimide film. For example, the lower protective film BPF may be an opaque yellow film, however, it should not be particularly limited as long as the lower protective film BPF has flexibility and protects a lower portion of the display module DM.

The protective panel PP may be disposed under the lower protective film BPF. The lower member BP may be disposed under the protective panel PP. As the protective panel PP and the lower member BP may be disposed under the lower protective film BPF, an impact resistance of the display device ED may be improved. The protective panel PP and the lower member BP may protect components disposed on the protective panel PP. The lower member BP may include a functional layer such as a cushion layer.

The protective film WPF may be referred to as a window protective film WPF. Since the protective film WPF may be attached onto the window WD, the impact resistance of the display device ED may be improved. The protective film WPF may protect components disposed under the protective film WPF. A hard coating layer and an anti-fingerprint layer may be additionally provided to the protective film WPF to improve properties, such as chemical resistance and abrasion resistance. The protective film WPF may include a transparent material.

An adhesive layer AD may be disposed between the protective film WPF and the window WD. The adhesive layer AD may be an optically clear adhesive film, an optically clear resin, or a pressure sensitive adhesive film.

The window WD may be disposed between the adhesive layer AD and the display module DM. The window WD may protect the display module DM from external scratches and impacts. The window WD may include an optically transparent insulating material. As an example, the window WD may include a thin-film glass. The image generated by the display module DM may be provided to a user after passing through the window WD. The window WD may have a single-layer or multi-layer structure. As an example, the window WD may include at least one of a touch screen film and an optical film. The optical film may be, for example, a polarization film, a diffusion film, and a protective film.

The window WD may be disposed on the display module DM and may include a folding portion FP folded along the folding axis FX and a non-folding portion NFP. The folding portion FP may overlap the folding area FA in a plan view. The non-folding portion NFP may include a first non-folding portion NFP1 and a second non-folding portion NFP2. The first non-folding portion NFP1 may overlap the first non-folding area NFA1 in case of being viewed in a plan view. The second non-folding portion NFP2 may overlap the second non-folding area NFA2 in case of being viewed in a plan view.

The folding portion FP of the window WD may include a first folding surface WFS1 and a second folding surface WFS2. The first folding surface WFS1 may be adjacent to the display module DM. The second folding surface WFS2 may be opposite to the first folding surface WFS1 and may be spaced apart from the first folding surface WFS1. Multiple first grooves HM1 may be defined through the first folding surface WFS1, and multiple second grooves HM2 may be defined through the second folding surface WFS2. The first grooves HM1 may be alternately arranged with the second grooves HM2 along the second direction DR2 in case of being viewed in a plan view. In the case where the first grooves HM1 are alternately arranged with the second grooves HM2 along the second direction DR2 in case of being viewed in a plan view, the window WD may be inwardly folded (inner-folding) or outwardly folded (outer-folding) depending on its operation mode. In case that a force is applied to the window WD and the window WD is inwardly folded (inner-folding), a width in the second direction DR2 of the second grooves HM2 may decrease. In case that a force is applied to the window WD and the window WD is outwardly folded (outer-folding), a width in the second direction DR2 of the first grooves HM1 may decrease. The first grooves HM1 and the second grooves HM2 may not overlap the non-folding portion NFP in case of being viewed in a plan view.

Referring to FIGS. 3 and 5, a first width W1 may correspond to a distance between the first folding surface WFS1 and the second folding surface WFS2. The first width W1 may correspond to a thickness or a maximum thickness of the window WD. The first width W1 may be in a range of about 100 μm to about 175 μm. As an example, the first width W1 may be selected from about 100 μm, about 125 μm, about 150 μm, and about 175 μm, however, this may be merely an example.

A second width W2 may correspond to a thickness W2 of a sidewall portion SP between one of the first grooves HM1 and one of the second grooves HM2 which is adjacent to the first groove HM1. The second width W2 may correspond to a separation distance between the first groove HM1 and the second groove HM2 which are adjacent to each other. The second width W2 may be in a range of about 25 μm to about 35 μm. As an example, the second width W2 may be about 31 μm, however, this may be merely an example. A ratio of the second width W2 to the first width W1 may be in a range of about 25/175 to about 35/100. As an example, the ratio of the second width W2 to the first width W1 may be selected from about 31/100, about 31/125, about 31/150, and about 31/175. In a case where the ratio of the second width W2 to the first width W1 is smaller than about 25/175, the second width W2 may become relatively thin compared with the first width W1, and thus buckling may occur in the folding portion FP in case that the display device ED or the window module WDM is inwardly or outwardly folded by the user. In a case where the ratio of the second width W2 to the first width W1 is greater than about 35/100, the second width W2 may become relatively thick compared with the first width W1, and thus a tensile strain of the folding portion FP may exceed about 2.5% in case that the display device ED or the window module WDM is inwardly or outwardly folded by the user, thereby causing a crack.

A third width W3 may correspond to a distance W3 between two first grooves HM1 adjacent to each other among the first grooves HM1, and may correspond to a distance between two second grooves HM2 adjacent to each other among the second grooves HM2. The distance W3 between the first grooves HM1 may correspond to a length of a portion of the first folding surface WFS1 between the first grooves HM1, and the distance W3 between the second grooves HM2 may correspond to a length of a portion of the second folding surface WFS2 between the second grooves HM2. The distance W3 between the first grooves HM1 may be a minimum distance between the first grooves HM1, and the distance W3 between the second grooves HM2 may be a minimum distance between the second grooves HM2. The third width W3 may be in a range of about 120 μm to about 150 μm. As an example, the third width W3 may be about 134 μm, however, this may be merely an example. A ratio of the third width W3 to the first width W1 may be in a range of about 120/175 to about 150/100. As an example, the ratio of the third width W3 to the first width W1 may be selected from about 134/100, about 134/125, about 134/150, and about 134/175.

A fourth width W4 may correspond to a width W4 in the second direction DR2 of each of the first grooves HM1 and the second grooves HM2. The width W4 of the first grooves HM1 may be the width W4 of the first groove HM1 in the first folding surface WFS1, and the width W4 of the second grooves HM2 may be the width W4 of the second groove HM2 in the second folding surface WFS2. The width W4 in the second direction DR2 of each of the first grooves HM1 and the second grooves HM2 may correspond to a maximum width of the grooves HM1 and HM2. The fourth width W4 may be in a range of about 80 μm to about 100 μm. As an example, the fourth width W4 may be about 89 μm, however, this may be merely an example. A ratio of the fourth width W4 to the first width W1 may be in a range of about 80/175 to about 1. As an example, the ratio of the fourth width W4 to the first width W1 may be selected from about 89/100, about 89/125, about 89/150, and about 89/175.

A fifth width W5 may correspond to a distance W5 between a first bottom surface B-HMI1 at which a bottom of the first grooves HM1 is defined and the first folding surface WFS1 and may correspond to a distance W5 between a second bottom surface B-HM2 at which a bottom of the second grooves HM2 is defined and the second folding surface WFS2. The fifth width W5 may correspond to a depth of the first groove HM1 or a depth of the second groove HM2. The fifth width W5 may be in a range of about 60 μm to about 140 μm. As an example, the fifth width W5 may be selected from about 60 μm, about 65 μm, about 85 μm, about 90 μm, about 110 μm, and about 115 μm, however this may be merely an example. The ratio of the fifth width W5 to the first width W1 may be in a range of about 60/175 to about 140/100.

The window WD may include multiple first folding intermediate portions FBP1 and multiple second folding intermediate portions FBP2. The first folding intermediate portions FBP1 may overlap the first grooves HM1, respectively, in case of being viewed in a plan view. The second folding intermediate portions FBP2 may overlap the second grooves HM2, respectively, in case of being viewed in a plan view. The window WD may include multiple first bottom surfaces B-HM1 respectively overlapping the first grooves HM1 in case of being viewed in a plan view and multiple second bottom surfaces B-HM2 respectively overlapping the second grooves HM2 in case of being viewed in a plan view. A sixth width W6 may correspond to a thickness of one first folding intermediate portion FBP1 among the first folding intermediate portions FBP1. The sixth width W6 may be the shortest distance between the first bottom surface B-HM1 and the second folding surface WFS2. A seventh width W7 may be a thickness of one second folding intermediate portion FBP2 among the second folding intermediate portions FBP2. The seventh width W7 may be the shortest distance between the second bottom surface B-HM2 and the first folding surface WFS1. The sixth width W6 may be different from the seventh width W7. Each of the sixth width W6 and the seventh width W7 may be in a range of about 35 μm to about 40 μm. As an example, the sixth width W6 may be about 35 μm or about 40 μm, however, this may be merely an example. The sixth width W6 and the seventh width W7 may be about equal.

A ratio of the sixth width W6 to the first width W1 may be in a range of about 35/175 to about 40/100. A ratio of the seventh width W7 to the first width W1 may be in a range of about 35/175 to about 40/100. As an example, the ratio of the sixth width W6 to the first width W1 may be selected from about 35/100, about 35/125, about 35/150, and about 35/175. As an example, the ratio of the seventh width W7 to the first width W1 may be selected from about 40/100, about 40/125, about 40/150, and about 40/175. In a case where the ratio of the sixth width W6 to the first width W1 or the ratio of the seventh width W7 to the first width W1 is smaller than about 35/175, the sixth width W6 or the seventh width W7 may become relatively thin compared with the first width W1, and thus buckling may occur in the folding portion FP in case that the display device ED or the window module WDM is inwardly or outwardly folded by the user. In case that the ratio of the sixth width W6 to the first width W1 or the ratio of the seventh width W7 to the first width W1 is greater than about 40/100, the sixth width W6 or the seventh width W7 may become relatively thick compared with the first width W1, and thus, the tensile strain of the folding portion FP may exceed about 2.5% in case that the display device ED or the window module WDM is inwardly or outwardly folded by the user, thereby causing a crack.

FIG. 4 shows the inner-folding state of the display device ED shown in FIG. 3 folded along the folding axis FX.

Referring to FIGS. 3 and 4, a radius of curvature R of the display device ED may correspond to the shortest distance between the folding axis FX and the display device ED. The radius of curvature R may correspond to the shortest distance between the folding axis FX and an upper surface of the protective film WPF. The radius of curvature R may be in a range of about 1.0 mm to about 2.0 mm. As an example, the radius of curvature R may be selected from about 1.0 mm, about 1.5 mm, and about 2.0 mm, however, this may be merely an example.

In the disclosure, a universal testing machine (UTM) may be used to measure a Young's modulus may be an LF plus series from Lloyd Instruments Ltd., and hereinafter will be referred to as the universal testing machine.

In the window WD, a ratio of the Young's modulus of the folding portion FP to the Young's modulus of the non-folding portion NFP may be in a range of about 30/70000 to about 2000/70000.

The following Table 1 shows the ratio of the Young's modulus of the folding portion FP to the Young's modulus of the non-folding portion NFP, which may be allowable, depending on the thickness W1 between the first folding surface WFS1, the second folding surface WFS2, and the radius of curvature R of the display device ED. The expression "allowable" used herein means that no bending, buckling, or cracking occurs in the folding portion FP in case that the electronic device ED or the window module WDM is folded. The ratio of the Young's modulus of the folding portion FP to the Young's modulus of the non-folding portion NFP may be controlled by varying the first width W1 to the sixth width W6. As an example, in case that the second width W2 and the sixth width W6 decrease, the ratio of the Young's modulus of the folding portion FP to the Young's modulus of the non-folding portion NFP may decrease. The Young's modulus of the non-folding portion NFP of window WD, which may be measured at room temperature of about 25° C. using the universal testing machine, may be in a range of about 65 GPa to about 75 GPa. As an example, the Young's modulus of the non-folding portion NFP may be about 70 GPa, however, this may be merely an example.

TABLE 1

| | | Thickness (W1) | | | |
|---|---|---|---|---|---|
| | | 100 μm | 125 μm | 150 μm | 175 μm |
| radius of curvature | 1.0 mm | about 30/70000 to about 2000/70000 | about 50/70000 to about 2000/70000 | about 75/70000 to about 2000/70000 | about 100/70000 to about 2000/70000 |
| | 1.5 mm | about 30/70000 to about 2000/70000 | about 50/70000 to about 2000/70000 | about 100/70000 to about 2000/70000 | about 100/70000 to about 2000/70000 |
| | 2.0 mm | about 30/70000 to about 2000/70000 | about 75/70000 to about 2000/70000 | about 100/70000 to about 2000/70000 | about 100/70000 to about 2000/70000 |

Referring to Table 1, in the case where the thickness W1 between the first folding surface WFS1 and the second folding surface WFS2 is about 100 μm and the radius of curvature R is in a range of about 1.0 mm to about 2.0 mm, the ratio of the Young's modulus of the folding portion FP to the Young's modulus of the non-folding portion NFP may be in a range of about 30/70000 to about 2000/70000. In a case where the thickness W1 between the first folding surface WFS1 and the second folding surface WFS2 is about 100 μm, the radius of curvature R is in a range of about 1.0 mm to about 2.0 mm, and the ratio of the Young's modulus of the folding portion FP to the Young's modulus of the non-folding portion NFP is smaller than about 30/70000, buckling may occur in the folding portion FP, and as a result, irreversible changes in physical properties may occur due to the buckling. In a case where the thickness W1 between the first folding surface WFS1 and the second folding surface WFS2 is about 100 μm, the radius of curvature R is in a range of about 1.0 mm to about 2.0 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP. In the case where the thickness W1 between the first folding surface WFS1 and the second folding surface WFS2 is about 125 μm and the radius of curvature R is in a range of about 1.0 mm to about 1.5 mm, the ratio of the Young's modulus of the folding portion FP to the Young's modulus of the non-folding portion NFP may be in a range of about 50/70000 to about 2000/70000. In a case where the thickness W1 between the first folding surface WFS1 and the second folding surface WFS2 is about 125 μm, the radius of curvature R is in a range of about 1.0 mm to about 1.5 mm, and the ratio of the Young's modulus of the folding portion FP to the Young's modulus of the non-folding portion NFP is smaller than about 50/70000, buckling may occur in the folding portion FP, and as a result, irreversible changes in physical properties may occur due to the buckling. In a case where the thickness W1 between the first folding surface WFS1 and the second folding surface WFS2 is about 125 μm, the radius of curvature R is in a range of about 1.0 mm to about 1.5 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP.

In the case where the thickness W1 between the first folding surface WFS1 and the second folding surface WFS2 is about 150 μm and the radius of curvature R is about 1.0 mm, the ratio of the Young's modulus of the folding portion FP to the Young's modulus of the non-folding portion NFP may be in a range of about 75/70000 to about 2000/70000. In a case where the thickness W1 between the first folding surface WFS1 and the second folding surface WFS2 is about 150 μm, the radius of curvature R is about 1.0 mm, and the ratio of the Young's modulus of the folding portion FP to the Young's modulus of the non-folding portion NFP is smaller than about 75/70000, buckling may occur in the folding portion FP, and as a result, irreversible changes in physical properties may occur. In a case where the thickness W1 between the first folding surface WFS1 and the second folding surface WFS2 is about 150 μm, the radius of curvature R is about 1.0 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP.

In the case where the thickness W1 between the first folding surface WFS1 and the second folding surface WFS2 is about 125 μm and the radius of curvature R is about 2.0 mm, the ratio of the Young's modulus of the folding portion FP to the Young's modulus of the non-folding portion NFP may be in a range of about 75/70000 to about 2000/70000. In a case where the thickness W1 between the first folding surface WFS1 and the second folding surface WFS2 is about 125 μm, the radius of curvature R is about 2.0 mm, and the ratio of the Young's modulus of the folding portion FP to the Young's modulus of the non-folding portion NFP is smaller than about 75/70000, buckling may occur in the folding portion FP, and as a result, irreversible changes in physical properties may occur. In a case where the thickness W1 between the first folding surface WFS1 and the second folding surface WFS2 is about 125 μm, the radius of curvature R is about 2.0 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP.

In the case where the thickness W1 between the first folding surface WFS1 and the second folding surface WFS2 is in a range of about 150 μm to about 175 μm and the radius of curvature R is in a range of about 1.5 mm to about 2.0 mm, the ratio of the Young's modulus of the folding portion FP to the Young's modulus of the non-folding portion NFP may be in a range of about 100/70000 to about 2000/70000. In a case where the thickness W1 between the first folding surface WFS1 and the second folding surface WFS2 is in a range of about 150 μm to about 175 μm, the radius of curvature R is in a range of about 1.5 mm to about 2.0 mm, and the ratio of the Young's modulus of the folding portion FP to the Young's modulus of the non-folding portion NFP is smaller than about 100/70000, buckling may occur in the folding portion FP, and as a result, irreversible changes in physical properties may occur. In a case where the thickness W1 between the first folding surface WFS1 and the second folding surface WFS2 is in a range of about 150 μm to about 175 μm, the radius of curvature R is in a range of about 1.5 mm to about 2.0 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP.

In the case where the thickness W1 between the first folding surface WFS1 and the second folding surface WFS2 is about 175 μm and the radius of curvature R is about 1.0 mm, the ratio of the Young's modulus of the folding portion FP to the Young's modulus of the non-folding portion NFP may be in a range of about 100/70000 to about 2000/70000. In a case where the thickness W1 between the first folding surface WFS1 and the second folding surface WFS2 is about 175 μm, the radius of curvature R is about 1.0 mm, and the ratio of the Young's modulus of the folding portion FP to the Young's modulus of the non-folding portion NFP is smaller than about 100/70000, buckling may occur in the folding portion FP, and as a result, irreversible changes in physical properties may occur. In a case where the thickness W1 between the first folding surface WFS1 and the second folding surface WFS2 is about 175 μm, the radius of curvature R is about 1.0 mm, and the ratio of the Young's modulus of the folding portion FP to the Young's modulus of the non-folding portion NFP is greater than about 2000/70000, the tensile strain may exceed about 2.5%, and as a result, a crack may occur in the folding portion FP.

Although the embodiments of the disclosure have been described, it may be understood that the disclosure should not be limited to these embodiments but various changes and modifications can be made by one ordinary skilled in the art within the spirit and scope of the disclosure as hereinafter claimed. Therefore, the disclosed subject matter should not be limited to any single embodiment described herein, and the scope of the inventive concept shall be determined according to the attached claims.

What is claimed is:

1. A display device comprising:

a display module folded with respect to a folding axis that extends in a first direction; and a window disposed on the display module and comprising a folding portion and a non-folding portion, the folding portion comprising:

a first folding surface adjacent to the display module, the first folding surface including a plurality of first grooves defined therein; and a second folding surface opposite to the first folding surface and spaced apart from the first folding surface by a thickness of the window, the second folding surface including a plurality of second grooves defined therein, wherein the folding portion folds with respect to the folding axis, and a ratio of a Young's modulus of the folding portion to a Young's modulus of the non-folding portion is in a range of 30/70000 to 2000/70000.

2. The display device of claim 1, wherein the thickness of the window is in a range of 100 μm to 175 μm, and a radius of curvature with respect to the folding axis is in a range of 1.0 mm to 2.0 mm.

3. The display device of claim 2, wherein the thickness of the window is 100 μm.

4. The display device of claim 2, wherein the thickness of the window is 125 μm, the radius of curvature is in a range of 1.0 mm to 1.5 mm, and the ratio of the Young's modulus of the folding portion to the Young's modulus of the non-folding portion is in a range of 50/70000 to 2000/70000.

5. The display device of claim 2, wherein the ratio of the Young's modulus of the folding portion to the Young's modulus of the non-folding portion is in a range of 75/70000 to 2000/70000; and either the thickness of the window is 150 μm and the radius of curvature is 1.0 mm, or the thickness of the window is 125 μm and the radius of curvature is 2.0 mm.

6. The display device of claim 2, wherein the ratio of the Young's modulus of the folding portion to the Young's modulus of the non-folding portion is in a range of 100/70000 to 2000/70000; and either the thickness of the window is 175 μm and the radius of curvature is 1.0 mm, or the thickness of the window is in a range of 150 μm to 175 μm and the radius of curvature is in a range of 1.5 mm to 2.0 mm.

7. The display device of claim 1, wherein the Young's modulus of the non-folding portion is in a range of 65 GPa to 75 GPa.

8. The display device of claim 1, wherein the plurality of first grooves and the plurality of second grooves are disposed in an alternating manner in a second direction intersecting the first direction in a plan view.

9. The display device of claim 1, wherein the window comprises a plurality of first folding intermediate portions and a plurality of second folding intermediate portions, the plurality of first folding intermediate portions overlap the plurality of first grooves respectively in a plan view, the plurality of second folding intermediate portions overlap the plurality of second grooves respectively in a plan view, and a thickness of each of the plurality of first folding intermediate portions and each of the plurality of second folding intermediate portions is in a range of 35 μm to 40 μm.

10. The display device of claim 9, wherein the thickness of each of the plurality of first folding intermediate portions and the thickness of each of the plurality of second folding intermediate portions are substantially equal to each other.

11. The display device of claim 1, wherein a width in a second direction intersecting the first direction of each of the plurality of first grooves and each of the plurality of second grooves is in a range of 80 μm to 100 μm.

12. The display device of claim 1, wherein a width of a sidewall portion of the folding portion disposed between one of the plurality of first grooves and an adjoining one of the plurality of second grooves is in a range of 25 μm to 35 μm.

13. The display device of claim 1, wherein each of a distance between two of the plurality of first grooves that are adjacent to each other and a distance between two of the plurality of second grooves that are adjacent to each other is in a range of 120 μm to 150 μm.

14. The display device of claim 1, further comprising:

a protective film disposed on the window.

15. The display device of claim 1, wherein the window comprises a glass material.

16. The display device of claim 1, wherein the plurality of first grooves and the plurality of second grooves do not overlap the non-folding portion in a plan view.

17. A window module comprising:

a window comprising a folding portion and a non-folding portion; and a protective film disposed on the window, the folding portion comprising:

a first folding surface including a plurality of first grooves defined therein; and a second folding surface including a plurality of second grooves defined therein, the second folding surface is opposite to the first folding surface and is spaced apart from the first folding surface by a thickness of the window, wherein the folding portion folds with respect to a folding axis that extends in a first direction, a ratio of a Young's modulus of the folding portion to a Young's modulus of the non-folding portion is in a range of 30/70000 to 2000/70000, and a shortest distance between the folding axis and an upper surface of the protective film is in a range of 1.0 mm to 2.0 mm.

18. The window module of claim 17, further comprising:

an adhesive layer disposed between the window and the protective film.

19. The window module of claim 17, wherein the plurality of first grooves and the plurality of second grooves are disposed in an alternating manner in a second direction intersecting the first direction in a plan view.

20. The window module of claim 17, wherein the plurality of first grooves and the plurality of second grooves do not overlap the non-folding portion in a plan view.

21. An electronic device comprising:

a display module folded with respect to a folding axis that extends in a first direction; and a window disposed on the display module and comprising a folding portion and a non-folding portion, the folding portion comprising:

a first folding surface adjacent to the display module, the first folding surface including a plurality of first grooves defined therein; and a second folding surface opposite to the first folding surface and spaced apart from the first folding surface by a thickness of the window, the second folding surface including a plurality of second grooves defined therein, wherein the folding portion folds with respect to the folding axis, and wherein a ratio of a Young's modulus of the folding portion to a Young's modulus of the non-folding portion is in a range of 30/70000 to 2000/70000.

* * * * *